July 12, 1932.   C. E. MAYNARD   1,867,370
GUIDE FOR TIRE BUILDING MACHINES
Filed May 20, 1930   3 Sheets-Sheet 1
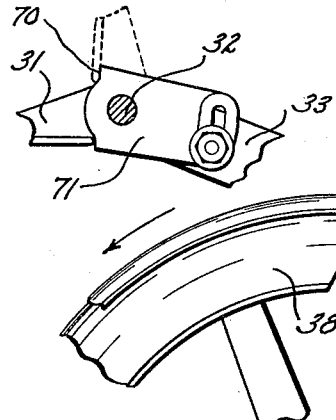
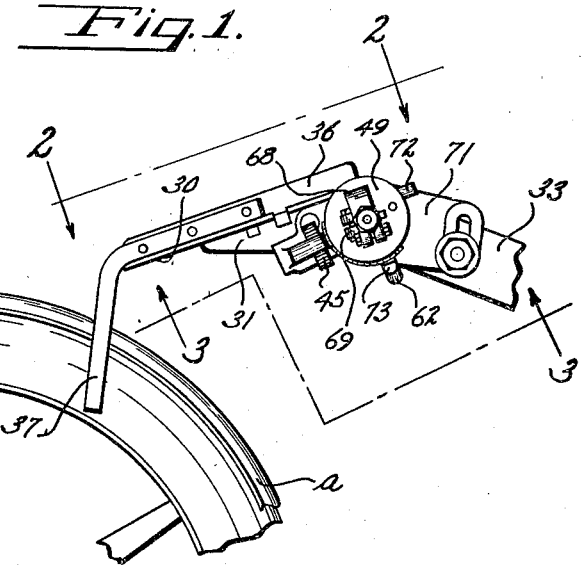
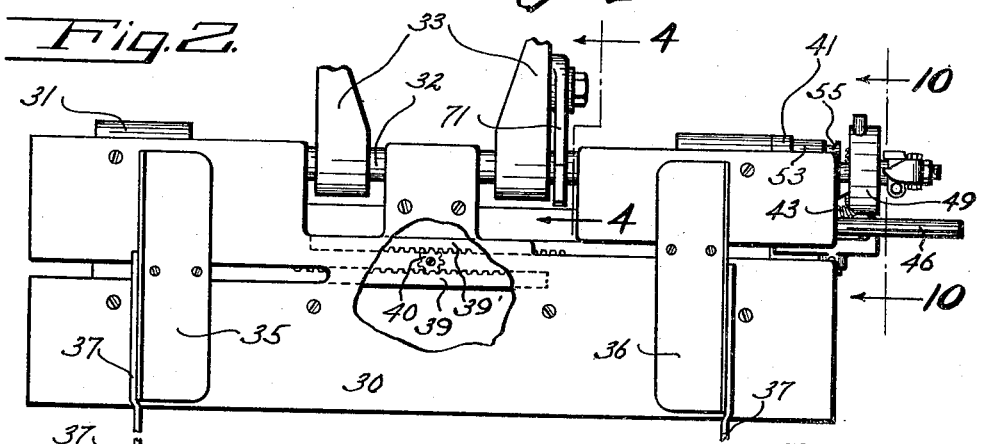
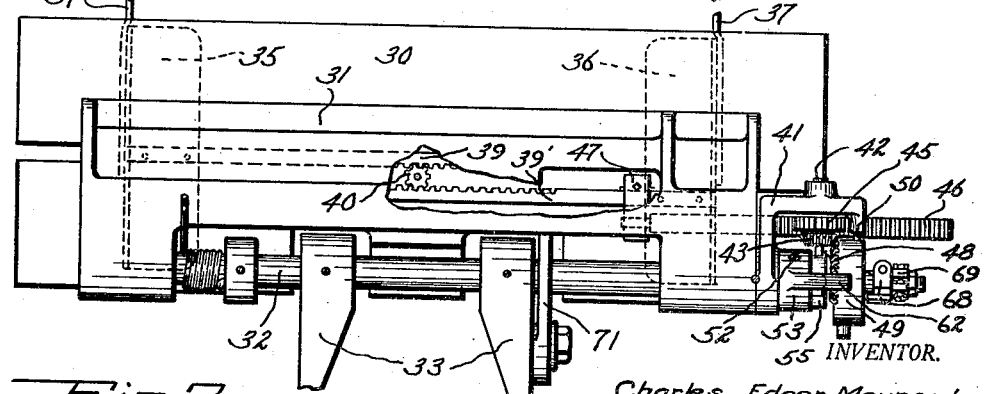
INVENTOR.
Charles Edgar Maynard
BY
ATTORNEY.

July 12, 1932.  C. E. MAYNARD  1,867,370
GUIDE FOR TIRE BUILDING MACHINES
Filed May 20, 1930  3 Sheets-Sheet 2
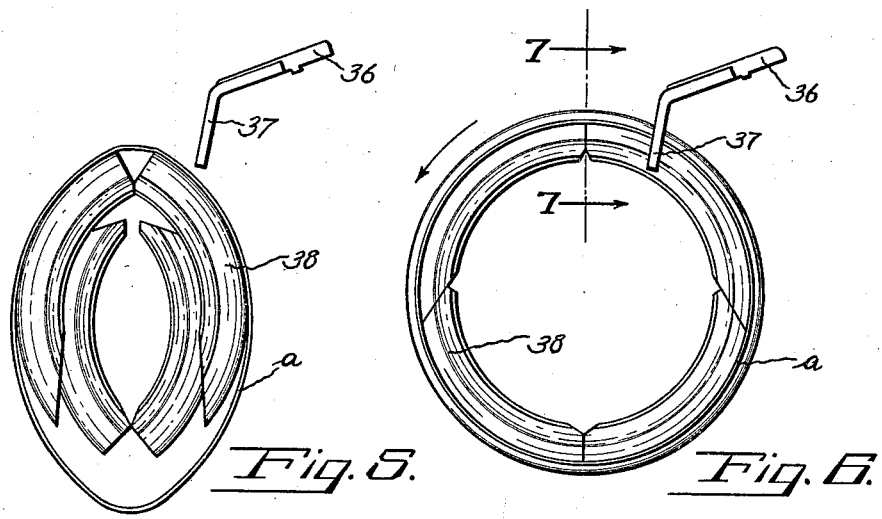
*Fig. 5.*  *Fig. 6.*
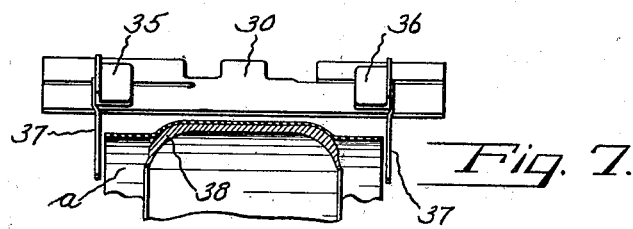
*Fig. 7.*
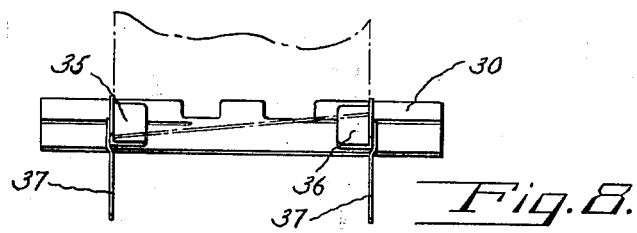
*Fig. 8.*
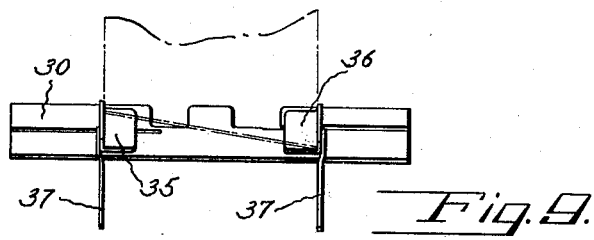
*Fig. 9.*
INVENTOR.
Charles Edgar Maynard.
BY
ATTORNEY.

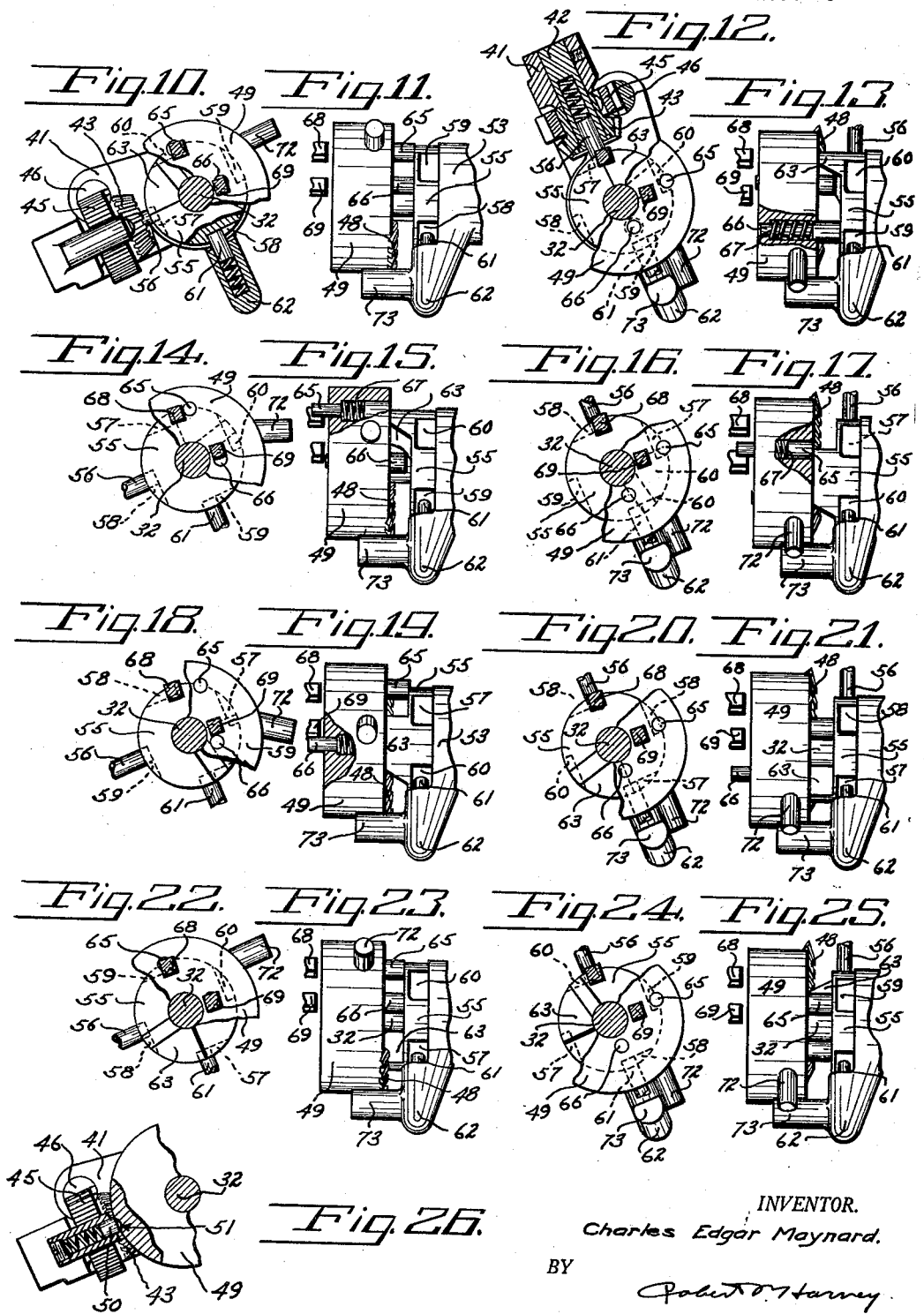

Patented July 12, 1932

1,867,370

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

GUIDE FOR TIRE BUILDING MACHINES

Application filed May 20, 1930. Serial No. 453,906.

My invention relates to a device for delivering strips of carcass material to a tire building machine. In certain types of tire construction the succeeding strips of rubberized material which are built into the tire are of varying width and it is one object of my invention to provide an improved fabric guide which in the normal operation of building a tire will be automatically set to accommodate the various widths of material as the latter are successively fed onto the building former. A further object is to provide a guide of the above character such that the first strip or plies of fabric may if desired be placed on the building former in the shape of an endless band and while the building former is in collapsed position, the guide functioning to assist the centering of the endless band on the flat core. Other and further objects will be apparent from the following specification and claims.

In the accompanying drawings which illustrate one embodiment of my invention,

Fig. 1 is a side elevation of a device embodying my invention shown located adjacent a tire building drum;

Fig. 2 is a view taken substantially on line 2—2 of Fig. 1;

Fig. 3 is a view taken substantially on line 3—3 of Fig. 1;

Fig. 4 is a view taken on line 4—4 of Fig. 2;

Fig. 5 is a diagrammatic view showing a pocket of fabric located over a collapsed drum;

Fig. 6 is a similar view showing the drum in expanded position;

Fig. 7 is a view taken on line 7—7 of Fig. 6;

Figs. 8 and 9 are similar views, but showing the guides set to accommodate different widths of fabric;

Figs. 10, 14, 18 and 22 are detail views showing the guide changing mechanism, and taken substantially on line 10—10 of Fig. 2;

Figs. 11, 15, 19 and 23 are views taken respectively from the right of Figs. 10, 14, 18 and 22;

Figs. 12, 16, 20 and 24 are detail views showing the guide changing mechanism when the guides are in inoperative position;

Figs. 13, 17, 21 and 25 are views taken respectively from the right of Figs. 12, 16, 20 and 24; and Fig. 26 is a detail view showing an index pin.

As shown in the drawings, my improved guiding device comprises a plate 30 secured to brackets 31 pivoted on a shaft 32 rigidly held in brackets 33 which are conveniently supported from the frame of the building machine, not shown. Slidable on plate 30 are a pair of flanged upright guiding members 35 and 36 provided with extensions 37 which, as best shown in Figs. 1, 5 and 6, are bent downwardly to embrace the edges of a tire building former 38. When the first plies of fabric material are to be placed on the core in the form of an endless band or pocket, as indicated at $a$ in Fig. 5, the extensions 37 are sufficiently close to the collapsed core, as shown in Fig. 5, to afford guiding means to the operator in centering the band or pocket on the former. As previously stated, in constructing certain tires the succeeding strips of carcass material vary in width, three such widths being indicated in Figs. 7, 8 and 9, and, as will be obvious, guide members 35 and 36 must be re-set to accommodate these different widths. After the first strip of material is placed on the former bracket 31 and the guiding members supported thereby are in the normal sequence of operation pivoted about shaft 32, to the position shown in dotted line in Fig. 4, to leave the tire former free for the operations of shaping the strip of carcass material to the core.

To position the next strip of fabric on the core the building mechanism will be pivoted back to the position shown in Fig. 1 and I utilize this pivotal movement to automatically set guides 35 and 36 to the proper width of the strip to be fed. To accomplish this I provide guides 35 and 36, respectively, with racks 39 and 39′ adapted to engage opposite sides of a pinion 40 rotatably mounted on the under side of plate 30. As will be obvious, by this arrangement movement of guide 36 would cause a corresponding movement, but in an opposite direction, of guide 35. Secured to bracket 31 and therefore movable with the guiding mechanism about shaft 32 is a frame 41 in which is secured a stub shaft 42 on the free end of which is rotatably mounted a bevel gear 43 to which is splined a pinion 45 meshing with a rack 46 slidably mounted on the under side of plate 30. As best shown in Fig. 3, one end of rack 46 is adjustably clamped as at 47 to rack 39' of guide member 36. Rotatably mounted on the end of shaft 32 and provided with a bevel gear segment 48 is a cylindrical member 49. The gear segment 48 is in mesh with beveled gear 43 and member 49 is constrained to move with frame 41 through a spring-pressed pin 50, see Fig. 26, carried by the frame 41 and engaging a depression 51 formed in the periphery of cylinder 49. As will be clear from the above description and Fig. 3, so long as the pin 50 remains in engagement with depression 51 member 49 will pivot about shaft 32 with the guide 31 and its associated parts and no relative movement will take place between bevel gear 43 and segment 48. If, however, member 49 should be restrained from pivotal movement with frame 41 about shaft 32, thus holding the beveled segment 48 stationary, rotation would be imparted to bevel gear 43 and through it to pinion 45 and rack 46 to move the guiding members 35 and 36 toward or from each other.

Adjustably secured to shaft 32 by a set screw 52 is a collar 53 and freely rotatable on shaft 32 between collar 53 and cylinder 49 is a cam member 55. Cam member 55 is adapted for step by step rotation by means of a ratchet arrangement comprising a spring-pressed pin 56, see Fig. 12, mounted in stub shaft 42 and adapted to engage in one of a series of notches 57, 58, 59 and 60 formed in the periphery of cam member 55. A second spring pressed pin 61, see Fig. 10, is mounted in an arm 62, formed integral with collar 53. Through the mechanism just described it will be clear that movement of the guiding mechanism from the position shown in Fig. 1 to the dotted line position shown in Fig. 4 will effect a quarter turn of cam member 55. This movement is illustrated in Figs. 10 and 12.

Cam member 55 is provided with a cam projection 63, which is brought into position, by the step by step movement of the cam member, to engage in subsequent positions pins 65 and 66 slidably mounted in cylindrical member 49. When pins 65 and 66 are engaged by cam 63 they are projected outwardly on the opposite side of the member 49 against springs 67 and into position to respectively engage stops 68 and 69 adjustably secured to the end of shaft 32.

The apparatus as shown in Fig. 1 and associated figures is set for the first ply. This setting is accomplished by bringing the guides 35 and 36 to the desired width between the uprights and locking the clamp 47 in place on the rack 39. The portion 63 of the cam 55 is, at this position of the guide, in the location shown in Fig. 10.

After the guiding of the first ply into place the unit is tilted upward against upper stop 70 on a member 71 (Fig. 4) to enable the operator to perform tire constructing operations. Due to this tilting a pin 72 in member 49 comes to rest against a lug 73 on arm 62 and pin 56 indexes the cam clockwise until pin 61 drops into the stop 59 succeeding the similar stop 58 drawn from the pin 61 during the indexing.

When the second ply is to be located the operator draws the guide into position over the drum. The cam, and consequently the portion 63, stays in the position into which it has been indexed due to the pin 61 which has dropped into the stop 59. The pin 56, however, will ride out of the stop 57 and drop in stop 58. Pin 50, fitting into the indentation in the member 49 draws this block with the rest of the unit until the pin 65, riding up onto the portion 63 and projecting out of the outside of the member 49, engages with the stop 68 (see Figs. 14 and 15). The gear segment 48 on member 49 is thus checked in its movement allowing the bevel gear 43 and pinion 45 to rotate and move the racks 46, 39 and 39'. As this rack movement controls the guides 35 and 36 which are fixed to racks 39 and 39', it will be obvious that the amount the guides are moved depends upon the amount the guide unit moves after the movement of the member 49 is checked by the stop 68.

The tilting upward and bringing down of the guide unit is again repeated for the next ply, the cam 55 being indexed as before. As will be seen in the drawings (Figs. 18 and 19) the portion 63 has been progressed so that the pin 66 will be affected by it, this pin, when the unit is brought down, striking against the stop 69 which has been set in a predetermined position. Again, as before, the setting of the guides 35 and 36 for this third ply depends upon the guide unit's travel after the movement of the member 49 has been arrested.

The fourth and final position of the cam 55 brings the unit down over the drum with the guide members 35 and 36 at their extreme outward position, this being the same as the setting for the first ply. This is caused by the portion 63 not acting on either pin 65 or 66, but allowing the member 49 to move the entire distance with the unit. As the apparatus illustrated has been constructed for three plies the fourth position is used for the tire tread. After the tread is guided in place the guide unit is again tilted upward into its inoperative position to allow the tire finishing operations and the tire's removal from the drum 38. The unit is now in readiness for the first ply of the next tire to be built.

Having thus described my invention, I claim:

1. A device for guiding fabric to the building former of a tire building machine which comprises a plate mounted for movement to and from operative position with respect to the building former, guide flanges slidably supported on the plate and means to automatically set the flanges in position to accommodate varying widths of fabric upon successive movements of the plate into operative position.

2. A device for guiding fabric to the building former of a tire building machine which comprises a plate mounted for movement to and from operative position with respect to the building former, guide flanges slidably supported on the plate, extended portions on the flanges projecting over the edge of the plate a distance sufficient to guide material onto the building former when the latter is in collapsed position, and means to automatically set the flanges in position to accommodate varying widths of fabric upon successive movements of the plate into operative position.

3. A device for guiding fabric to the building former of a tire building machine which comprises a plate, mounted for movement to and from operative position with respect to the building former, guide flanges supported on the plate for simultaneous movement toward and from each other and means to automatically move the guide flanges a predetermined amount upon movement of the plate to and from operative position.

4. A device for guiding fabric to the building former of a tire building machine which comprises a plate pivoted for arcuate movement to and from operative position with respect to the building former, guide flanges supported on the plate for simultaneous movement toward and from each other and means to automatically move the guide flanges a predetermined amount upon pivotal movement of the plate.

5. A device for guiding fabric to the building former of a tire building machine which comprises a plate mounted for movement to and from operative position with respect to the building former, guide flanges supported on the plate for simultaneous movement toward and from each other, flange moving means operatively connected to the flanges and normally partaking of the movement of the plate, and means to restrain such movement of the flange moving means to cause relative movement of the flanges and plate when the latter is moved to and from operative position.

6. A device for guiding fabric to the building former of a tire building machine which comprises a plate pivoted for arcuate movement to and from operative position with respect to the building former, guide flanges supported on the plate for simultaneous movement toward and from each other, flange moving means operatively connected to the flanges and normally partaking of the pivotal movement of the plate, and means to restrain pivotal movement of the flange moving means to cause relative movement of the flanges and plate upon pivotal movement of the plate.

7. A device for guiding fabric to the building former of a tire building machine which comprises a plate mounted for movement to and from operative position with respect to the building former, guide flanges supported on the plate for simultaneous movement toward and from each other, flange moving means operatively connected to the flanges and normally partaking of the movement of the plate, and means automatically operative at a predetermined point in the movement of the plate to hold the flange moving means stationary with respect to the plate to cause a predetermined relative movement of the flanges with respect to the plate.

8. A device for guiding fabric to the building former of a tire building machine which comprises a plate pivoted for arcuate movement to and from operative position with respect to the building former, guide flanges supported on the plate for simultaneous movement toward and from each other, flange moving means operatively connected to the flanges and normally partaking of the pivotal movement of the plate, and means automatically operative at a predetermined point in the movement of the plate to restrain pivotal movement of the flange moving means to cause a predetermined relative movement of the flanges with respect to the plate.

9. In a device of the character described a fixed shaft, a bearing member mounted thereon for free pivotal movement through a limited arc, a plate fixed to the bearing member, a pair of opposed side guides movable over the plate, a gear segment on the shaft normally moved with the bearing when the bearing is pivoted about the shaft, means for arresting the movement of said gear segment at predetermined points in the pivotal movement of the bearing, a gear meshing with the said gear segment and adapted to be rotated when the movement of the gear segment is arrested, and means whereby rotation of the gear will cause the side guides to move simultaneously in opposite directions a distance depending upon the point of arrest of the gear segment.

10. In a device of the character described a fixed shaft, a bearing member mounted thereon for free pivotal movement through a limited arc, a plate fixed to the bearing member, a pair of opposed side guides movable over the plate, extended portions on the side guides projecting over the edge of the said plate a distance sufficient to guide material onto a collapsed tire building drum, a gear segment of the shaft normally moved with the bearing when the bearing is pivoted about the shaft, means for arresting the movement of said gear segment at predetermined points in the pivotal movement of the bearing, a gear meshing with the said gear segment and adapted to be rotated when the movement of the gear segment is arrested, and means whereby rotation of the gear will cause the side guides to move simultaneously in opposite directions a distance depending upon the point of arrest of the gear segment.

11. A device for guiding fabric on the building former of a tire building machine which comprises opposed side guides having projecting portions extending downwardly on opposite sides of the building former and of sufficient length to form centering means for an endless band of tire material positioned on the building former when the latter is in collapsed condition.

12. A device for guiding fabric on the building former of a tire building machine which comprises opposed side guides having projecting portions extending downwardly on opposite sides of the building former and of sufficient length to form centering means for an endless band of tire material positioned on the building former when the latter is in collapsed condition and means for simultaneously moving the guides relative to each other.

CHARLES EDGAR MAYNARD.